(12) United States Patent
Yu et al.

(10) Patent No.: US 7,956,856 B2
(45) Date of Patent: Jun. 7, 2011

(54) METHOD AND APPARATUS OF GENERATING OR RECONSTRUCTING DISPLAY STREAMS IN VIDEO INTERFACE SYSTEMS

(75) Inventors: Qing Yu, Sunnyvale, CA (US); Ding Lu, Sunnyvale, CA (US)

(73) Assignee: Parade Technologies, Ltd., Grand Cayman (KY)

( * ) Notice: Subject to any disclaimer, the term of this patent is extended or adjusted under 35 U.S.C. 154(b) by 1132 days.

(21) Appl. No.: 11/675,510

(22) Filed: Feb. 15, 2007

(65) Prior Publication Data
US 2008/0198153 A1    Aug. 21, 2008

(51) Int. Cl.
G09G 5/00    (2006.01)
(52) U.S. Cl. ......... 345/204; 345/211; 345/212; 345/213
(58) Field of Classification Search ............ 345/87–100, 345/204–215, 690–699
See application file for complete search history.

(56) References Cited

U.S. PATENT DOCUMENTS

| 5,739,867 A | 4/1998 | Eglit |
| 6,574,225 B2 * | 6/2003 | Reynolds et al. ........ 370/395.62 |
| 7,034,812 B2 | 4/2006 | Chen et al. |
| 7,071,992 B2 | 7/2006 | Chen et al. |
| 7,405,719 B2 * | 7/2008 | Kobayashi ...................... 345/98 |
| 7,487,273 B2 * | 2/2009 | Kobayashi ...................... 710/62 |
| 2003/0086442 A1 * | 5/2003 | Reynolds et al. ............. 370/503 |
| 2004/0056864 A1 * | 3/2004 | Valmiki et al. ................ 345/531 |
| 2005/0062699 A1 * | 3/2005 | Kobayashi ...................... 345/87 |
| 2005/0078126 A1 | 4/2005 | Park et al. |

OTHER PUBLICATIONS

"Digital Visual Interface—DVI," Digital Display Working Group, Revision 1.0, Apr. 2, 1999, pp. 1-76.
"High-Definition Multimedia Interface Specification, Version 1.3," Hitachi, Ltd., Jun. 22, 2006, pp. 1-237.
"DisplayPort™ Proposed Standard," Version 1, Video Electronics Standards Association, May 1, 2006, pp. 1-205.

* cited by examiner

Primary Examiner — Vijay Shankar
(74) Attorney, Agent, or Firm — Fenwick & West LLP

(57) ABSTRACT

A method and system for reading data from a link buffer for output to a display device. A link buffer read period is determined which balances a write throughput over a source video frame time and a read throughput over a display frame time. A threshold is determined indicating a required number of pixels stored in a link buffer prior to starting to read data out of the link buffer for a next line display. A read signal is issued when the link buffer read period ends and the threshold is reached.

24 Claims, 14 Drawing Sheets

Pixel-based Video Interface System 101

DisplayPort Video Interface System 201

METHOD AND APPARATUS OF GENERATING OR RECONSTRUCTING DISPLAY STREAMS IN VIDEO INTERFACE SYSTEMS

BACKGROUND OF THE INVENTION

The need for digital audio and video (A/V) interfacing has increased with current consumer electronics devices. Applications include, for example, interfacing personal computer (PC) desktops with a variety of display monitors, DVD players or set-up boxes with television sets, A/V receivers with television sets, and PC desktops with television sets. A variety of digital interface protocols are in use. Such display interface protocols include, but are not limited to, Digital Visual Interface (DVI), High Definition Multimedia Interface (HDMI), and DisplayPort. Furthermore, since there is a need for multiple electronic devices to interface with one another, there is a need for multi-port switching between devices.

FIG. 1 illustrates a prior art Pixel-based video interface system 101. The video interface system 101 is used to transport a video stream from a video source 100 to a display device such as an LCD/Plasma display device 104. In the prior art video interface system 101, video source 100 includes devices such as PC graphics cards, DVD players, set-top-box or other similar devices. Display devices include CRT based monitors, TVs, or pixel based LCD/Plasma monitors or TVs. Between the video source 100 and display device 104 there is a video link 102. The video link 102 includes a video transmitter 106, video receiver 108 and a link media. Typical types of link media in a pixel-based video transport system include VGA (analog), DVI, LVDS and HDMI. The video receiver 108 includes a scaler 300 described in further detail below in reference to FIG. 3.

Video source 100 may have a variety of different operating specifications or formats. These specifications and formats include video source resolution, video pixel color depth, and video clock rate. For example, a SVGA video mode has a resolution of 800×600 and a video clock rate of 40 Mhz. An SXGA video mode has a resolution of 1280×1024 and a video clock rate of 108 Mhz. Pixel-based video interface system 101 transports the video stream using the source video rate 100 as the link rate 112 and transport one pixel per link clock cycle. Therefore the video link 102 in these prior art systems needs to operate over a wide range of link rates. This makes it difficult for pixel-based video link 102 to reach the high link rates required by a high rate video source 100. Furthermore, another limitation of pixel-based video link 102 is that it is not flexible for different display format or color depth since the pixels are tied to the link rate.

There has been a trend to use non-pixel based video interface systems in which the video link link rate is decoupled from the source video rate. This non-pixel-based video interface system provides a flexible solution to accommodate a wide range of video sources. One example of such a non-pixel-based video interface system that incorporates a packet based link system is DisplayPort. Unlike the pixel-based video link, DisplayPort uses a fixed link rate. The video source stream is transported over the link through the packet mechanism. FIG. 2 illustrates a prior art non-pixel based video interface system such as DisplayPort. The video interface system 201 is used to transport a video stream from a video source 200 to a display device such as an LCD display 204. In the prior art video interface system 201, video source 200 includes devices such as PC graphics cards, DVD players, set-top-box or other similar devices. Display devices include CRT based monitors, TVs, or pixel based LCD/ Plasma monitors or TVs. Between the video source 200 and display device 204 there is a video link 202. The video link 202 includes a video transmitter 206, video receiver 208 and a link media such as Display Port. Video source 200 may have a variety of different operating specifications or formats. The non-pixel-based video interface system 201 transports the video stream at a fixed link rate 212 rather than the source video rate.

The advantages of this packet based video link include increased bandwidth, configurability, adoption ability and extension ability. The link is capable of carrying multiple video streams. HDMI 1.3 is another example of a packet based video link, where the link rate can be multiples of the source video rate in order to transport a video source stream with greater than 24-bit color depth.

With regard to display devices, pixel based display devices such as LCD panels or Plasma panel monitors and TVs, have a fixed display format and fixed display rate. For example, an XGA LCD panel has a fixed resolution of 1024×768 and a clock rate of approximately 65 Mhz. A 1080P LCD TV has a fixed resolution of 1920×1080 and a clock rate of 148 Mhz. In order to display a video source signal on this type of display device, a video scaler, usually composed of a big line buffer and a horizontal/vertical interpolator, is necessary to convert the source video format/rate to the destination display format/ rate. The video scaler typically includes a big line buffer and a horizontal/vertical (H/V) interpolator.

In the prior art, there are several solutions to convert the source video format to the display format in pixel-based video interface systems. All these solutions, referred to as video scalers, require explicit source video clock and source video timing control signaling (also referred to herein simply as "timing control"), such as video horizontal sync, horizontal display enable, vertical sync, and vertical display enable signals. The explicit video clock and video timing control signaling is readily available because the interface is based purely on the clock and timing of video source. FIG. 3 illustrates a prior art video scaler 300 for a pixel-based video interface system. An input sampler 302 receives a source video stream 310 and video timing control signaling 312. Video scaler 300 uses a PLL 308 which is used to convert the source video clock 314 to the display clock 316. A line buffer 304 is a large temporary buffer to store the video source lines to bridge the timing between video source and display destination. A horizontal/vertical interpolator 306 does the interpolation to create the display data 318.

In performing the video format conversion, one prior art video scaler discussed in U.S. Pat. No. 5,739,867 employs linear scaling techniques. It pre-determines off-line the destination display clock frequency and destination horizontal total time to make the destination video timing linear to the source video timing. The merit of this solution is that it is simple to implement and requires a relatively small line buffer. But this solution has several drawbacks: (1) It requires a PLL to generate display clock 316 which needs to lock to source video clock 314, (2) The resulting destination video horizontal timing may violate the display timing specifications, (3) The resulting destination video vertical timing may violate the display timing specifications, and (4) The last line of the frame could be short line or long line, violating the display timing specifications.

Another prior art solution discussed in U.S. Pat. No. 7,034, 812 uses a relatively larger line buffer and automatic tuning algorithm to search for the destination display line rate such that the line buffer over-run and under-run do not occur. This solution is more flexible in supporting different types of LCD monitors. However, it requires a larger buffer size and the auto tuning algorithm may take a long time to converge. Furthermore, the destination horizontal and vertical timing may also violate the LCD timing specifications.

Yet another prior solution discussed in U.S. Pat. No. 7,071,992 utilizes several techniques to bridge the different video format. Line buffer underflow or overflow issues are addressed by adjusting the output number of lines per frame or output number of pixels per line. Although solutions are provided to ensure the output video timing does not exceed the output device specifications, the solutions are based on the explicit input video timing. There are a few other solutions discussed in U.S. Patent Application, No. US2005/0078126 which are generally the variations of U.S. Pat. No. 5,739,867.

However, these prior solutions to convert the source video format to the display format discussed thus far cannot be directly applied to non-pixel based video interfaces as shown in FIG. 2. In non-pixel-based video interfaces, the source video clock and source video timing control are not directly available to the video receiver. Instead, this information may be embedded in the link data stream or link packet. Furthermore, an additional limitation is that the source video data stream received in the video link may not follow a strict source video timing. Instead, what is available in the link data is an isochronous data flow which only roughly reflects the source video timing. As a result, prior art solutions to convert the source video format to the display format in non-pixel based video interfaces require a two stage process as shown in FIG. 4. FIG. 4 illustrates a prior art two-stage video receiver.

In the first stage, the input video stream consisting of the source video data stream 418, source video timing control 420, and source video clock 422 carried over the link is recovered first using a link layer device comprising a link buffer 402 and a PLL1 404. This involves the use of PLL1 404 to recover the source video clock 422 from the link clock 416. The link buffer 402 is used to reconstruct source video timing control 420 and source video data stream 418. The second stage uses a conventional video scaler as shown in FIG. 3 to scale up or scale down the source video format into the desired destination display format. This involves a PLL 2 to generate the destination display clock 424 from the source video clock 422, and a video line buffer 408 to construct the destination display timing and data stream from the source video stream. This two-stage approach in which the source video clock, source video timing control, and source video data stream must be recovered requires several hardware resources. Furthermore, some of the hardware resources may perform duplicative or overlapping functions. For example, the link buffer in the first stage and the line buffer in the second stage basically do the same thing to temporally store the video data. Furthermore, the requirement of two PLLs in this solution increases the design complexity, increasing the silicon cost and power consumption.

Thus, there is a need for improved systems and methods for generating or reconstructing display streams in video interface systems.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
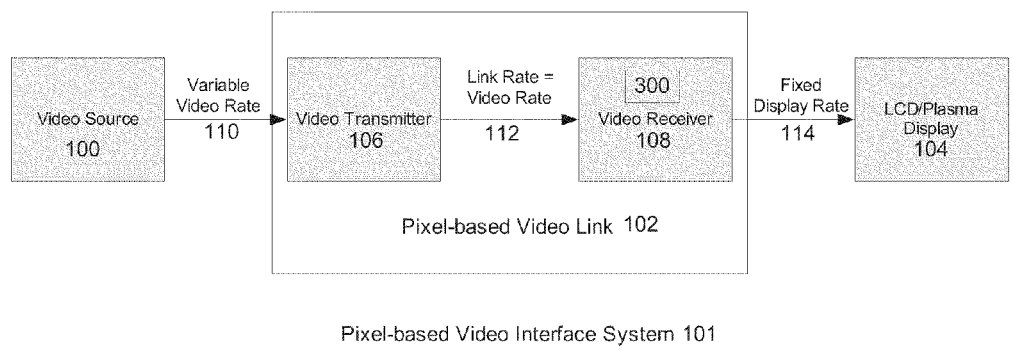
FIG. 1 illustrates a prior art pixel-based video interface system.

Systems and methods for generating or reconstructing display streams in video interface systems are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Particular circuit layouts and circuit components may be given for illustrative purposes. This is done for illustrative purposes to facilitate understanding only and one of ordinary skill in the art may vary the design and implementation parameters and still remain within the scope of the invention.

Generally, this description relates to the design and manufacture of video interface systems. In particular, display stream generation or reconstruction in video receivers and digital display controllers is described. Although examples are used in reference to video receivers, the circuits and methods described herein may be used in digital display controllers.

The circuits and methods described herein provide for a simple, yet flexible method for converting video data carried over a video link to the format that is suitable for display on a digital display device. The invention can be applied to DisplayPort, HDMI or DVI receivers, or any other digital or analog video receivers, or multiple format receivers of any combination. The VESA, DisplayPort™ Standard, Version 1, May 1, 2006, HDMI, High-Definition Multimedia Interface Specification, Version 1.3, Jun. 22, 2006, and DDWG, Digital Visual Interface, Revision 1.0, 1999, specifications are hereby incorporated by reference. The invention can also be applied to the digital display controllers. Although certain examples herein refer to typical applications associated with DisplayPort, HDMI, and DVI protocols, the systems and methods described herein can be applied to any digital A/V interface protocol for display format conversion.

The methods and systems described herein offer several advantages over prior art video receivers: Reconstruction of link data for display is performed directly in a single stage; the systems and methods do not rely on specific source video clock and/or video timing; a separate link buffer and line buffer are not required; two PLLs are not required; the methods and systems do not require an accurate source video clock, and can tolerate clock jitter caused by spread spectrum; the methods and systems use a plurality of FIFO buffer to write and/read multiple pixels per link clock In one example, circuits and methods for single stage reconstruction of a display data stream from a source video link in a non-pixel based video interface system or other video interface system where the source video clock is not explicitly available, the source video timing control is not explicitly available, or the source video data is carried isochronously over the video link. The circuits and methods described herein may also be used with a multiple input format video receiver or display controller which has at least one input that is non-pixel based or has the similar characteristics described herein.

In order to provide for single stage reconstruction of a display data stream from a source video link in a non-pixel based video interface system, the circuits and methods described herein bridge the link rate and display rate directly, balances the throughput between isochronous video data flow and fixed display data flow, and ensures display device timing specifications are met. By providing for single stage reconstruction, the circuits and methods described herein minimize silicon cost and power consumptions.

In one example, a method for generating a display stream for output to a display device is described. The method includes receiving a plurality of link data and a link clock at a video receiver in a packet based video link, writing the plurality of link data into a link data buffer, generating a display device clock from the link clock or a reference clock, and reading the plurality of link data out of the link data buffer for output to a display device such that a display device timing specification is met and throughput of the link data buffer is balanced. Reading the plurality of link data out of the link data buffer includes calculating a normalized link data buffer read period and a normalized display line period, calculating a line threshold, calculating a frame threshold, and calculating a synchronization threshold. Reading the plurality of link data further includes generating a link data buffer read signal based on the line threshold, the frame threshold, the synchronization threshold, the normalized link data buffer read period, the normalized display line period, and a number of entries in the link data buffer available for reading.

In one example, a video receiver circuit includes a buffering means for storing a link data, a data writing control means for writing the link data to the buffering means, and a data read control means for reading the link data from the buffering means for output to a display device such that a display device timing specification is met and throughput of the buffering means is balanced.

In one example, a method for reading data from a link buffer for output to a display device includes determining a link buffer read period which balances a write throughput over a source video frame time and a read throughput over a display frame time, determining a threshold indicating a required number of pixels stored in a link buffer prior to starting to read data out of the link buffer for a next line display, and issuing a read signal when the link buffer read period ends and the threshold is reached.

In one example, a video receiver circuit including a buffering means for storing link data, a read period control means for determining a buffering means read period which balances a write throughput over a source video frame time and a read throughput over a display frame time, a threshold control means for determining a threshold indicating a required number of pixels stored in a buffering means prior to starting to read data out of the buffering means for a next line display, and a read control means for issuing a read signal when the buffering means read period ends and the threshold is reached.

In one example, a video receiver circuit providing single stage reconstruction of link data including a buffering means for receiving a link data and a link clock, and a data writing control means for writing the link data to the buffering means. The circuit further includes a data read control means for reading the link data from the buffering means for output to a display device such that a display device timing specification is met and throughput of the buffering means is balanced. A phase lock loop circuit receives a reference clock and outputs a display clock to the data read control means. A horizontal/vertical interpolator for outputting display data to the display device.

In one example, a method for single stage reconstruction of link data in a video link includes receiving a link data and a link clock at a data buffer and writing the link data to the data buffer. The method includes receiving a reference clock at a phase lock loop circuit, where the phase lock loop circuit directly converts the reference clock to a display clock. The method further includes providing the display clock to a read controller, and reading the link data from the buffer with the read controller such that a display device timing specification is met and throughput of the buffer is balanced.

The description herein may occasionally use certain abbreviations for convenience. Generally, the term "display" refers to a digital display device, "video" refers to the video source, and "link" refers to the packet-based video link used to transport video data from the video source to the digital display device.

Abbreviations related to display attributes of the digital display device include:
 DSP_CK: Display pixel clock
 f_DSP_CK: Frequency of display pixel clock. It has a range between f_DSP_CK_min and f_DSP_CK_max
 T_DSP_CK: Cycle time of display pixel clock
 DSP_LP: Display line period, or the number of display clock cycles per display line. It has a range between DSP_LP_min and DSP_LP_max
 DSP_FP: Display frame period, or the number of lines per display frame. It has a range between DSP_FP_min and DSP_FP_max
 DSP_X: Display horizontal size, or the number of active pixels per display line
 DSP_Y: Display vertical size, or the number of active lines per display frame
 DSP_FM: Display frame time, or the number of display clock cycles per display frame These display attribute parameters are known for a given display device. The circuits and methods described herein convert the video stream received in the link to the display format which has the given display attributes.

Figure 2:
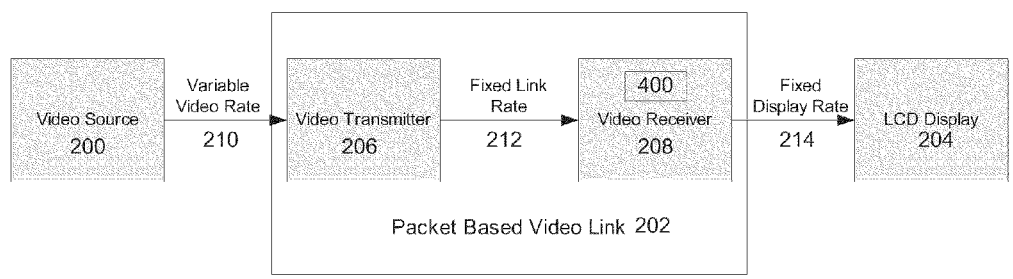
FIG. 2 illustrates a prior art DisplayPort video interface system.
Figure 3:
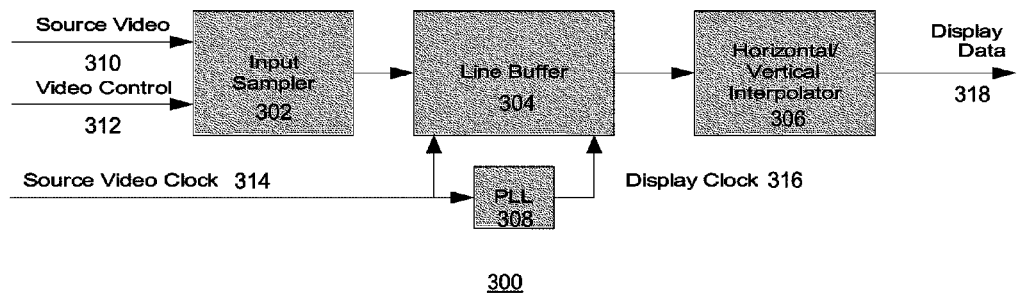
FIG. 3 illustrates a prior art video scaler.
Figure 4:
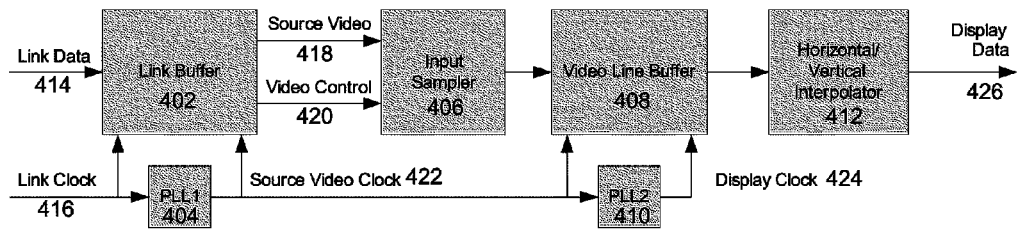
FIG. 4 illustrates a prior art two-stage video receiver.
Figure 5:
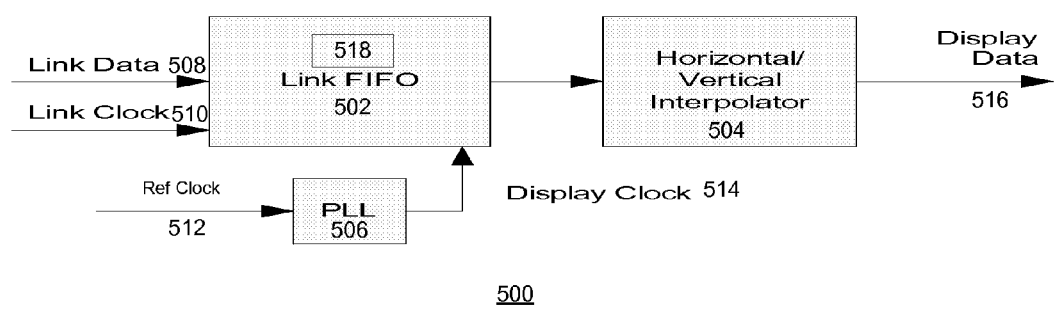
FIG. 5 illustrates a block diagram of a video receiver in one example of the invention.

Abbreviations related to source video attributes of the source video include:
 VID_CK: Video pixel clock
 f_VID_CK: Frequency of video pixel clock
 T_VID_CK: Cycle time of video pixel clock VID_LP: Video line period, or the number of video clock cycles per video line
VID_FP: Video frame period, or the number of lines per video frame
VID_X: Video horizontal size, or the number of pixels per video line
VID_Y: Video vertical size, or the number of active lines per video frame
VID_FM: Video frame time, or the number of video clock cycles per video frame
Abbreviations related to link parameters include:
LNK_CK: Link clock
f_LNK_CK: Frequency of link clock
T_LNK_CK: Cycle time of link clock
N/M: Ratio of link clock frequency over video clock frequency
Abbreviations related to the Link FIFO control include:
P/Q: The ratio of display clock frequency over link clock frequency
FIFO_WP: Link FIFO write period, or the number of LNK_CK it takes to write a video line into the link FIFO
FIFO_WP_norm: Normalized FIFO_WP
FIFO_WFM: Link FIFO frame write time, or the number of LNK_CK it takes to write a video frame into the link FIFO
FIFO_RP: Link FIFO read period, or the number of DSP_CK it takes to read a display line out of the link FIFO
FIFO_RP_norm: Normalized FIFO_RP
DSP_LP_norm: Normalized DSP_LP
DSP_FP_norm: Normalized DSP_FP
LN_TH: Line threshold for FIFO read control
FRM_TH: Frame threshold for FIFO read control
SYNC_TH: Sync threshold for FIFO read control
FST_LN_TH: The line threshold for the first line of display frame FIG. 5 illustrates a block diagram of a video receiver 500 in one example of the invention. Video receiver 500 receives link data 508 and link clock 510 at a link FIFO buffer (also referred to herein as "link FIFO" or "FIFO") 502. Although the present description uses and refers to a FIFO buffer, any data buffer may be used. Further examples of data buffers include, without limitation, SRAM, multiple write port buffers, and multiple read port buffers. Video receiver 500 is used in a packet based video link and receives link data 508 and link clock 510 from a video transmitter as shown in FIG. 2. Video receiver 500 includes a Link FIFO control block 518, PLL 506, and Horizontal/Vertical Interpolator 504. PLL 506 receives Ref clock 512 and outputs display clock 514 to Link FIFO 502. Horizontal/Vertical Interpolator 504 outputs display data 516.

Figure 6:
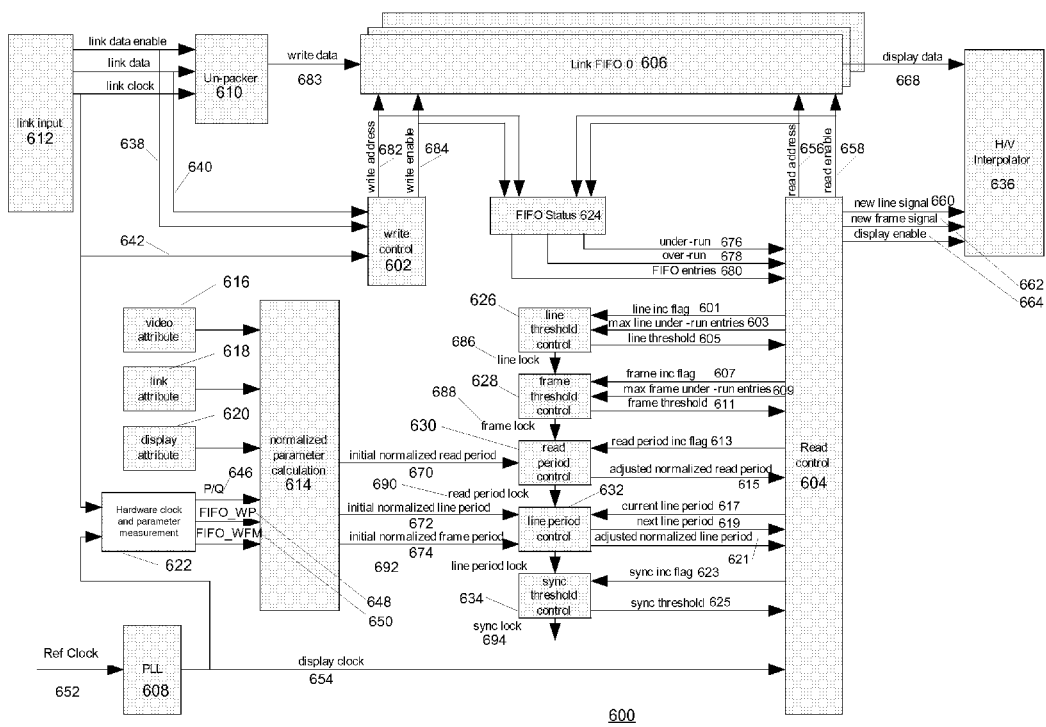
FIG. 6 illustrates a more detailed block diagram of the video receiver illustrated in FIG. 5.

FIG. 6 illustrates a video receiver 600 which is an implementation of video receiver 500 illustrated in FIG. 5 in one example of the invention. Video receiver 600 includes a link input 612, a plurality of link FIFO buffers 606, write control 602, read control 604, H/V interpolator 636, PLL 608, hardware clock and parameter measurement 622, and normalized parameter calculation 614. Read control 604 interfaces with line threshold control 626, frame threshold control 628, read period control 630, display line period control 632, and sync threshold control 634 to provide single stage reconstruction of a data stream from a source video link such that display device timing specifications are met and throughput of the link FIFO buffer is balanced to prevent under-run or over-run, thereby allowing for reconstruction where the source video clock and source video timing control are not explicitly available.

PLL 608 receives a reference clock 652 and outputs a display clock 654. Display clock 654 is input to read control 604 and hardware clock and parameter measurement 622. Hardware clock and parameter measurement 622 also receives link clock 642 from link input 612. Hardware clock and parameter measurement 622 outputs P/Q ratio 646, FIFO_WP 648, and FIFO_WFM 650 to normalized parameter calculation 614. Normalized parameter calculation 614 also receives video attributes 616, link attributes 618, and display attributes 620. Normalized parameter calculation 614 outputs an initial normalized read period 670 to read period control 630, initial normalized line period 672 to line period control 632, and initial normalized frame period 674 to line period control 632.

Write control 602 receives link data enable 638, link data 640, and link clock 642 from link input 612. Write control 602 outputs a write address 682 and write enable 684 to link FIFO buffer 606 and FIFO Status 624. Responsive to write control 602, write data 683 is written to link FIFO buffer 606 from un-packer 610. Read control 604 outputs a read address 656 and read enable signal 658 to link FIFO buffer 606 and FIFO Status 624. Responsive to read control 604, display data 668 is output from link FIFO buffer 606 to H/V interpolator 636. FIFO Status 624 outputs under-run status 676, over-run status 678, and FIFO entries 680 to read control 604. Under-run status occurs when the link FIFO read pointer is greater than the link FIFO write pointer, indicating that the read from the link FIFO is faster than the write to the link FIFO and that pixels are unavailable for reading. Over-run status occurs when the link FIFO write pointer minus the link FIFO read pointer is greater than the link FIFO levels, indicating that the write to the link FIFO is faster than the read from the link FIFO, resulting in some pixels stored in the link FIFO being over-written by new pixels. FIFO entries 680 are the number of pixels written in the link FIFO which are available to be read. The FIFO entries 680 are equal to the FIFO write pointer minus the FIFO read pointer.

Read control 604 outputs a new line signal 660, new frame signal 662, and display enable signal 664 to H/V Interpolator 636. As described earlier, read control 604 interfaces with line threshold control 626, frame threshold control 628, read period control 630, line period control 632, and sync threshold control 634. Line threshold control 626 receives a line increment flag 601 and max line under-run entries 603 and outputs a line threshold 605 to read control 604. Frame threshold control 628 receives a frame increment flag 607 and max frame under-run entries 609 and outputs a frame threshold 611 to read control 604. Read period control 630 receives a read period increment flag 613 and outputs an adjusted normalized read period 615 to read control 604. Line period control 632 receives a current line period 617 and outputs a next line period 619 and adjusted normalized line period 621 to read control 604. Sync threshold control 634 receives a sync increment flag 623 and outputs a sync threshold 625 to read control 604.

A line period lock 692 is set after a line period coarse tune is performed in line period control 632. The line period is the normalized line period during the whole frame. The actual line period in each line is adjusted with a different scheme during the active display period and the non-active display period.

A read period lock 690 is set after a read period coarse tune is performed in read period control 630. The read period is the minimum line period during the active display period in a frame.

There are three lock flags: line lock, frame lock and sync lock. Line lock 686 is set after a coarse tune for the line threshold in line threshold control 626. Frame lock 688 is set after a coarse tune for the frame threshold in frame threshold control 628. Sync lock 694 is set after coarse tune for the sync threshold in sync threshold control 634.

Video receiver 600 advantageously uses a single PLL 608 to generate the display clock from the link clock directly. PLL 608 may be a simple, stand alone PLL. The reference clock 652 for PLL 608 could be any clock, include, but not limited to, a external reference clock, a crystal, or internally generated reference clock, or the link clock LNK_CK. PLL 608 generates and outputs a display clock DSP_CK 654 whose frequency is within f_DSP_CK_min and f_DSP_CK_max. One advantage of using single PLL 608 to generate DSP_CK 654 is that the PLL design could be relative simple. The accuracy requirement of the DSP_CK frequency is not very high, as long as it falls within the display device specification:

$f\_DSP\_CK\_min <= f\_DSP\_CK <= f\_DSP\_CK\_max$

Link FIFO buffer 606 stores the video data pixels. In one example, link FIFO buffer 606 is a simple one-write/one-read synchronous FIFO. Link FIFO buffer 606 performs two functions: (1) It buffers the link data stream to allow compensation for link packet jitter and link clock jitter, and (2) It provides a temporary buffer to store data for more than one display line for video to display format conversions. By performing these two functions, the video receiver 600 does not require a separate line buffer. This advantageously reduces silicon costs.

In one example, link FIFO buffer 606 comprises a plurality of FIFO buffers. Using a plurality of FIFO buffers allows link FIFO buffer 606 to write multiple pixels/per link clock cycle from the unpacker 610. For example, to support a 4-lane Display Port system, link FIFO buffer 606 comprises 4 link FIFOs.

Figure 7:
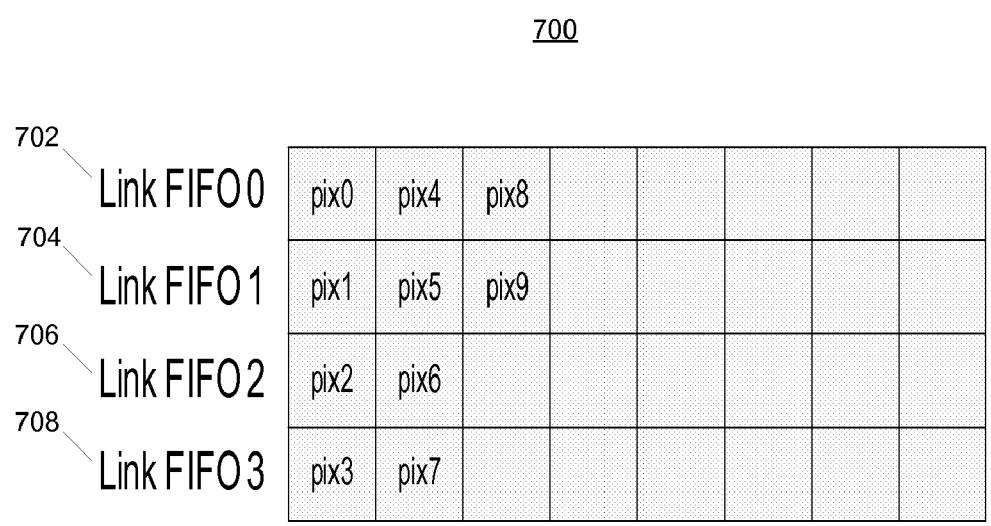
FIG. 7 illustrates video pixel organization in the link buffer.

FIG. 7 illustrates one example of how pixel data is organized in a link FIFO buffer 700 consisting of 4 link FIFOs Link FIFO0 702, Link FIFO1 704, Link FIFO2 706, and Link FIFO3 708. With each link clock cycle, a pixel is written into each of the 4 link FIFOs. Thus, pix0 is written into Link FIFO0 702, pix1 is written into Link FIFO2 704, pix2 is written into Link FIFO2 706, and pix3 is written into Link FIFO3 708 in a single clock cycle, where pix0, pix1, pix2, and pix3 are pixels from a line of data.

Figure 8:
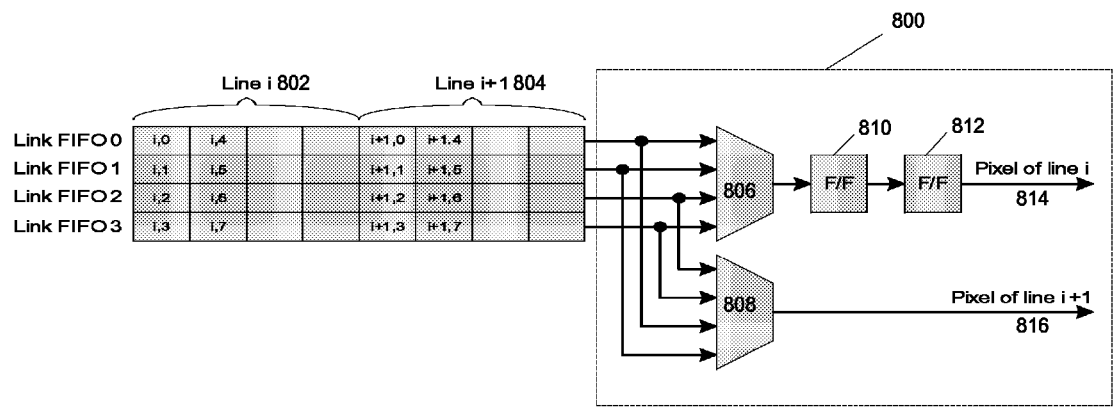
FIG. 8 illustrates a circuit to output pixels from two video line.

The multiple Link FIFO architecture also makes it feasible to output more than one video pixel per display clock cycle for vertical interpolation. For vertical interpolation, it is sometime necessary to have pixels from different video lines output at the same time. For example for bi-linear interpolation, two pixels are required every display clock cycle. For bi-cubic interpolation, four pixels are required every display clock cycle. The multiple Link FIFOs architecture provides this capability. FIG. 8 illustrates an output circuit 800 to output pixels from two video lines at one display clock cycle. A multiplexer 806 and multiplexer 808 coupled to a link FIFO buffer outputs pixels from a line i 802 and line i+1 804 at each display clock cycle. A flip flop (F/F) 810 and flip flop 812 coupled to multiplexer 806 output a pixel of line i 814. Multiplexer 808 outputs a pixel of line i+1 816. Generally, a n-Link FIFO architecture can output video pixels from n video lines every display clock.

Referring again to FIG. 6, the video link input 612 may have different configurations, such as a different link clock or different number of lanes and the video stream carried over the video link may have a variety of formats such as a different spatial resolution, different color depth or a different refresh rate. Un-packer 610 operates to re-construct the video stream data into the format that is suitable for current invention. Write control 602 operates to write the un-packed video data into the link FIFO buffer 606 in the manner described in reference to FIG. 7.

Read control 604 controls the data flow out of the Link FIFO buffer 606. Read control 604 balances the throughput of the FIFO input and the FIFO output so that the data flow does not suffer under-run (write throughput is lower than read throughput and causes the break of display data flow) or over-run (write throughput is higher than read throughput and causes the jam of display data flow). Additionally, read control 604 ensures that the display data flow conforms to the display device format/timing specification while balancing the throughput.

Read control 604 balances the link FIFO buffer 606 throughput and ensures that the display device format/timing specifications are conformed with by advantageously: (1) Using hardware to measure certain source video and link attributes, (2) Using measured, or given, source video, link and display attributes to pre-calculate normalized control parameters which provide the initial control parameters for read control 604, (3) Using threshold-based FIFO read control to adjust the display read period and/or display line period, (4) Using an adaptive control mechanism to adaptively adjust the FIFO read control 604 parameters, and (5) Using adaptive parameter control to guarantee display device timing specifications are conformed with. These items are discussed in further detail below.

As described earlier, measured or given source video, link and display attributes are used to pre-calculate normalized control parameters which provide the initial control parameters for read control 604. An initial normalized link FIFO read period FIFO_RP_norm, initial normalized display line period DSP_LP_norm, and initial normalized display frame period DSP_FP_norm are calculated by normalized parameter calculation 614.

In order to balance the write throughput and read throughput of the link FIFO buffer 606, a timing reference is required. However, the video stream carried over the video link is an isochronous stream and it may not have an exact video timing reference. Therefore, in one example the video frame time VID_FM is used as the timing reference. Read control 604 balances the throughput by balancing the average Link FIFO write and read throughput over a video frame time.

The FIFO write throughput over a video frame time is:
VID_X*VID_Y/VID_Y*FIFO_WP*T_LNK_CK
The FIFO read throughput over a display frame time is:
VID_X*VID_Y/DSP_Y*FIFO_RP*T_DSP_CK
To balance two of them, a normalized FIFO read period can be derived:
FIFO_RP_norm=(VID_Y/DSP_Y)*FIFO_WP*(P/Q)

Theoretically, this normalized FIFO read period is the time that FIFO read control will generate one display line. Therefore, it is necessary to make sure this period is within the display line period specification:
DSP_LP_min<=FIFO_RP_norm<=DSP_LP_max If the normalized read period FIFO_RP_norm is outside the required display line specification, it is necessary to adjust some parameters. For example, if FIFO_RP norm is too short, DSP_Y is decreased. If FIFO_RP_norm is too long, the ratio of P/Q is decreased, or equivalently, the display clock frequency is lowered.

A normalized line period, DSP_LP_norm, and normalized frame period, DSP_FP_norm are used to generate the display line during the display blank time. They are also used in the adaptive line period control 632 to prevent a residue line at the end of the display frame, where a residue line occurs when the last line of a display frame has too few or too many pixels and hence violates the display device timing specification. The DSP_LP norm is given as:

DSP_LP_norm=DSP_FM/DSP_FP_norm

In order to have the necessary precision, DSP_LP_norm is a fraction. The DSP_FP_norm is given as:

DSP_FP_norm=round (DSP_FM/FIFO_RP_norm)

where

DSP_FM=FIFO_WFM*(P/Q)

DSP_FP_norm is rounded to the nearest integer.

The ratio P/Q is the ratio of the display clock frequency over the link clock frequency. The ratio P/Q is used in deriving the link FIFO read period FIFO_RP as set forth above. An estimated P/Q may be calculated since the link clock and pre-defined display clock are known attributes. However, in a real system, the link clock and display device clock are not precisely the same as defined. As a result, in one example, video receiver 600 uses a hardware measurement circuit (hardware clock and parameter measurement 622) to measure a more precise value of the P/Q ratio.

A more accurate P/Q ratio improves the precision of the normalized read period calculation. A more accurate normalized read period can reduce the needed size of the link FIFO since the FIFO read throughput will match FIFO write throughput more precisely. Furthermore, a more accurate P/Q ratio can also result in a more accurate frame time DSP_FM and normalized line period DSP_LP_norm calculation.

A further advantage of using hardware clock and parameter measurement 622 is that it enables link FIFO read control 604 to track the clock frequency variation or the variation introduced by spread spectrum modulation.

Receiver 600 advantageously does not rely on explicit source video timing control information. Hardware clock and parameter measurement 622 measures FIFO line write period FIFO_WP and FIFO frame write time FIFO_WFM in the link clock domain. FIFO_WP is used in calculating normalized FIFO read period FIFO_RP_norm to balance the FIFO write and read throughput. FIFO_WFM is used to calculate the normalized line period DSP_LP_norm and normalized frame period DSP_FP_norm to generate the display line and in adaptive line period control.

The state machine read control 604 issues the read control signals read address 656 and read enable signal 658 for the link FIFO display data read. Read control 604 also generates the new line signal 660, new frame signal 662, and display enable signal 664 for the horizontal/vertical interpolator 636. Receiver 600 advantageously does not rely on source video timing control signals such as HSYNC, VSYNC and DE. To achieve this, two criteria are used: the FIFO threshold and the read period FIFO_RP. Receiver 600 generates a FIFO read enable signal 658 based on the value of FIFO entries 680 and threshold settings line threshold 605, frame threshold 611, and sync threshold 625. The read enable signal 658 and display control signals, including new line signal 660, new frame signal 662, and display enable signal 664 are controlled to meet display interface timing specification limits.

The FIFO threshold is a parameter that specifies when to start reading pixels from the link FIFO for the next line display. When the number of FIFO entries is greater than or equal to the FIFO threshold, the FIFO read controller issues a read signal to begin reading pixels from the link FIFO. The FIFO threshold controls the quantity of video data available in the link FIFO when the FIFO read controller begins to read pixels for the next line display. The FIFO threshold varies based on whether the first line of a frame is being read or a subsequent line. If the first line is being read, the FIFO threshold is equal to the first line threshold. If a line other than the first line is being read, the FIFO threshold is equal to the line threshold. The FIFO_RP determines the period of a display line.

Line threshold, frame threshold and sync threshold are entries that the link FIFO stores for use in determining whether to begin the read process. Setting of these thresholds is described in further detail below. For reading a display line other than first line, only the line threshold is used. At the end of read period, the FIFO read controller compares the current FIFO entries with the line threshold. If the current FIFO entries is greater than the line threshold, the FIFO read controller begins to read pixels from the link FIFO for the next display line.

As described in further detail below, for the first line in a frame a first line threshold is used. The first line threshold is equal to the sum of the line threshold, frame threshold, and sync threshold. At the beginning of reading a frame, the FIFO read controller compares the current FIFO entries with first line threshold. If the current FIFO entries are greater than the first line threshold, the FIFO read controller begins to read pixels from the link FIFO for the first line display. When the line period lock is set, the FIFO controller will also check if the current line width is greater than the minimum display line period defined by the display specification.

Read control 604 issues read enable signal 658 at the end of each normalized FIFO read period FIFO_RP_norm. When FIFO read control 604 issues read enable signal 658, it will also check if the line threshold LN_TH has been reached. When both normalized FIFO read period FIFO_RP_norm ends and the line threshold LN_TH is reached, the FIFO read enable signal 658 is issued. The Line threshold LN_TH is adjusted adaptively to prevent under-run as described below in reference to FIG. 11.

In certain instances, when the maximum display line period DSP_LP_max is reached, the line threshold LN_TH still has not been reached. In this case, read control 604 must still issue the read enable signal 658 so that the display interface timing specification, in this instance DSP_LP, is satisfied. As a result, the link FIFO buffer 606 will encounter under-run when reading data for the current display line. The under-run is not a result of an incorrect line threshold setting. Rather, it is the result of an incorrect frame threshold FRM_TH setting. A frame threshold FRM_TH 611 is adaptively generated to prevent under-run in an example of receiver 600.

The line threshold for reading the first line differs from line threshold LN_TH. The first line threshold FST_LN_TH may require an additional threshold to maintain frame synchronization. This additional threshold is synchronization threshold 625, which is adaptively generated and adjusted by sync threshold control 634. The FST_LN_TH is given as:

FST_LN_TH=LN_TH+FRM_TH+SYNC_TH

Normalized read period FIFO_RP_norm and line period DSP_LP_norm are adjusted adaptively to reduce the FIFO size requirement and to prevent the residue line at the end of the display frame.

Figure 9:
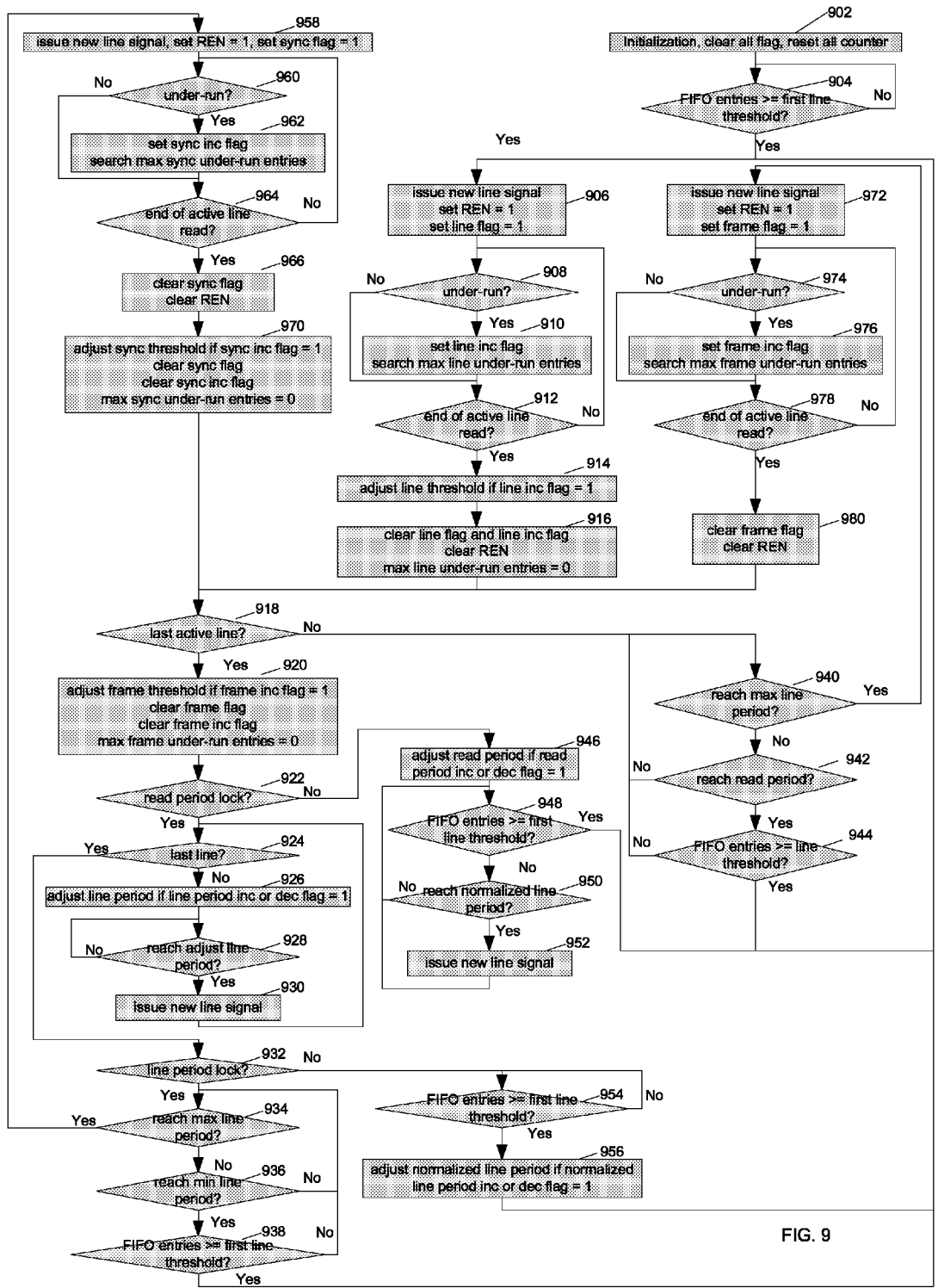
FIG. 9 illustrates a state diagram of link buffer read control.

FIG. 9 illustrates a state diagram of the operation of link buffer read control 604 in conjunction with line threshold control 626, frame threshold control 628. read period control 630, line period control 632, and sync threshold control 634 in one example. At block 902, all flags are cleared and counters reset. At decision block 904, read control 604 determines whether the FIFO entries are greater than or equal to the first line threshold FST_LN_TH. If no at decision block 904, then the process waits until yes at decision block 904. If yes at decision block 904, then at block 906 read control 604 issues a new line signal, sets REN=1, and sets line flag=1. At decision block 908, if there is under-run then at block 910 the line increment flag is set to 1 and the maximum line under run entries are searched. If no at decision block 908, then block 910 is bypassed. At decision block 912, read control 604 determines whether the end of the active line read for the line has been reached. If no at decision block 912, the process returns to decision block 908. If yes at decision block 912, then at block 914, the line threshold is adjusted if line increment flag=1. Line threshold adjustment is discussed in further detail in reference to FIG. 11 below. At block 916, the line flag and line increment flag are cleared, REN is cleared, and the max line under-run entries is set to 0. At decision block 918, the read control 604 determines whether the last active line in the display frame has been reached.

If no at decision block 918, then at decision block 940 it is determined whether the max line period DSP_LP_max has been reached. If no at decision block 940, at decision block 942 it is determined whether the read period FIFO_RP has been reached. If yes at decision block 940, then at block 972 read control 604 issues a new line signal, sets REN=1, and sets frame flag=1. At decision block 974, if there is under-run then at block 976 the frame increment flag is set to 1 and the maximum frame under-run entries are searched. If no at decision block 974, then block 976 is bypassed. At decision block 978, read control 604 determines whether the end of the active line read for the line has been reached. If no at decision block 978, the process returns to decision block 974. If yes at decision block 978, then at block 980 the frame flag and REN is cleared. Following block 980, the process returns to decision block 918.

If no at decision block 942, the process returns to decision block 940. If yes at decision block 942, then at decision block 944 it is determined whether the FIFO entries are greater than or equal to the line threshold. If no at decision block 944, then the process returns to decision block 940. If yes at decision block 944, the process returns to block 906.

If yes at decision block 918 indicating that the last active line has been reached, at block 920 the frame threshold is adjusted if the frame increment flag=1. Frame threshold adjustment is discussed in further detail in reference to FIG. 14. The frame flag is cleared, the frame increment flag is cleared, and the max fame under-run entries is set to zero.

At decision block 922, it is determined whether there is a read period lock. If no at decision block 922, then at block 946 the read period FIFO_RP is adjusted if the read period increment or decrement flag is equal to one. Following block 946, at decision block 948, it is determined whether the FIFO entries are greater than or equal to the first line threshold. If yes at decision block 948, the process returns to block 906. If no at decision block 948, then at decision block 950 it is determined whether the normalized line period DSP_LP_norm has been reached. If no at decision block 950, then the process returns to decision block 948. If yes at decision block 950, then a new line signal is issued at block 952. Following block 952, the process returns to block 948.

If at decision block 922 it is determined that there is a read period lock, at decision block 924 it is determined whether the last line of the frame has been reached. If no at decision block 924, then at block 926 the line period DSP_LP is adjusted if the line period increment or decrement flag is equal to 1. Line period adjustment is discussed further in reference to FIG. 16.

If yes at decision block 924, then the process skips to decision block 932. At decision block 928, it is determined whether the adjusted line period has been reached. If yes at decision block 928, then at block 930 a new line signal is issued. If no at decision block 928, the process waits until decision block 928 is yes. Following block 930, the process returns to decision block 924 to determine whether the last line has been reached.

If yes at decision block 924, at decision block 932 it is determined whether there is a line period lock. If no at decision block 932, at decision block 954, it is determined whether the FIFO entries are greater than or equal to the first line threshold. If no at decision block 954, then the process waits until decision block 954 is yes. If yes at decision block 954, then at block 956, the normalized line period is adjusted if the normalized line period increment or decrement flag is equal to 1. Following block 956, the process returns to block 906.

If yes at decision block 932, then at decision block 934 it is determined whether the maximum line period DSP_LP_max has been reached. If yes at decision block 934, then the process proceeds to block 958. If no at decision block 934, then at decision block 936 it is determined whether the minimum line period DSP_LP_min has been reached. If no at decision block 936, then the process returns to decision block 934. If yes at decision block 936, then at decision block 938 it is determined whether the FIFO entries are greater than or equal to the first line threshold. If no at decision block 938, then the process returns to decision block 934. If yes at decision block 938, the process returns to block 906.

If the maximum line period has been reached at decision block 934, then at block 958 a new line signal is issued, the REN is set to 1, and the sync flag is set to 1. At decision block 960, it is determined whether there is under-run. If no at decision block 960, the process skips to decision block 964. If yes at decision block 960, at block 962, the sync increment flag is set to 1 and the max sync under-run entries are searched. At decision block 964, it is determine whether the end of the active line read for the line has been reached. If no at decision block 964, the process returns to decision block 960. If yes at decision block 964, then at block 966 the sync flag is cleared and REN is cleared. At block 970, the sync threshold is adjusted if the sync increment flag is equal to 1, the sync flag is cleared, the sync increment flag is cleared, and the max sync under-run entries is set to 0. Following block 970, the process proceeds to decision block 918.

The line threshold LN_TH is checked when read control 604 begins to read data from link FIFO buffer 606 for the next line. When there are enough pixels in link FIFO buffer 606 to meet the FIFO threshold, read control 604 will issue read enable signal 658 for the next line. As a result of line threshold control LN_TH, the link FIFO buffer 606 will not under-run at the end of the next line. Line threshold LN_TH is controlled by line threshold control 626 and may be adaptively set by hardware.

Figure 10:
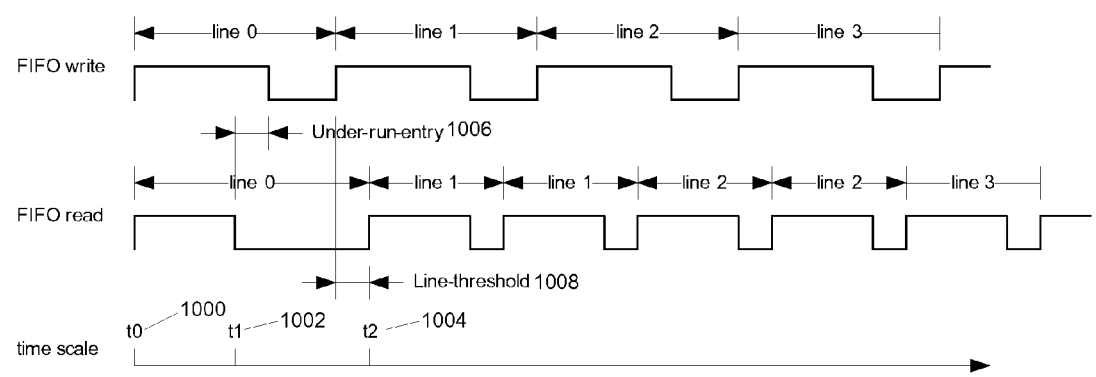
FIG. 10 illustrates a line threshold.

FIG. 10 illustrates the function of LN_TH. At first the line-threshold LN_TH is set to zero. From the waveform illustrated in FIG. 10, it is clear that FIFO will under-run soon after the controller issue FIFO read signal at a time t0 1000. At a time t1 1002, the FIFO write address is about ¾ Video_X, while the FIFO read address equals to Video_X. The under-run-entry 1006 is approximately ¼ Video_X. Then, the adaptive line threshold control will set a line threshold 1008 to ¼ Video_X for the following lines. At a time t2 1004, the write address is 1 and ¼ Video_X, while read address is 1 Video_X, the number of pixels in the link FIFO is ¼ Video_X. Then at time t2 1004, the threshold is reached and read signal is issued. It can be seen, at the end of second line, the link FIFO will not under-run.

Because in real environment, the FIFO write signal may not be the same as those signal in the waveform and there are some other variations introduced by clock jitter and link data package scheme, it is necessary to adaptively fine tune the line threshold for each display line.

Figure 11:
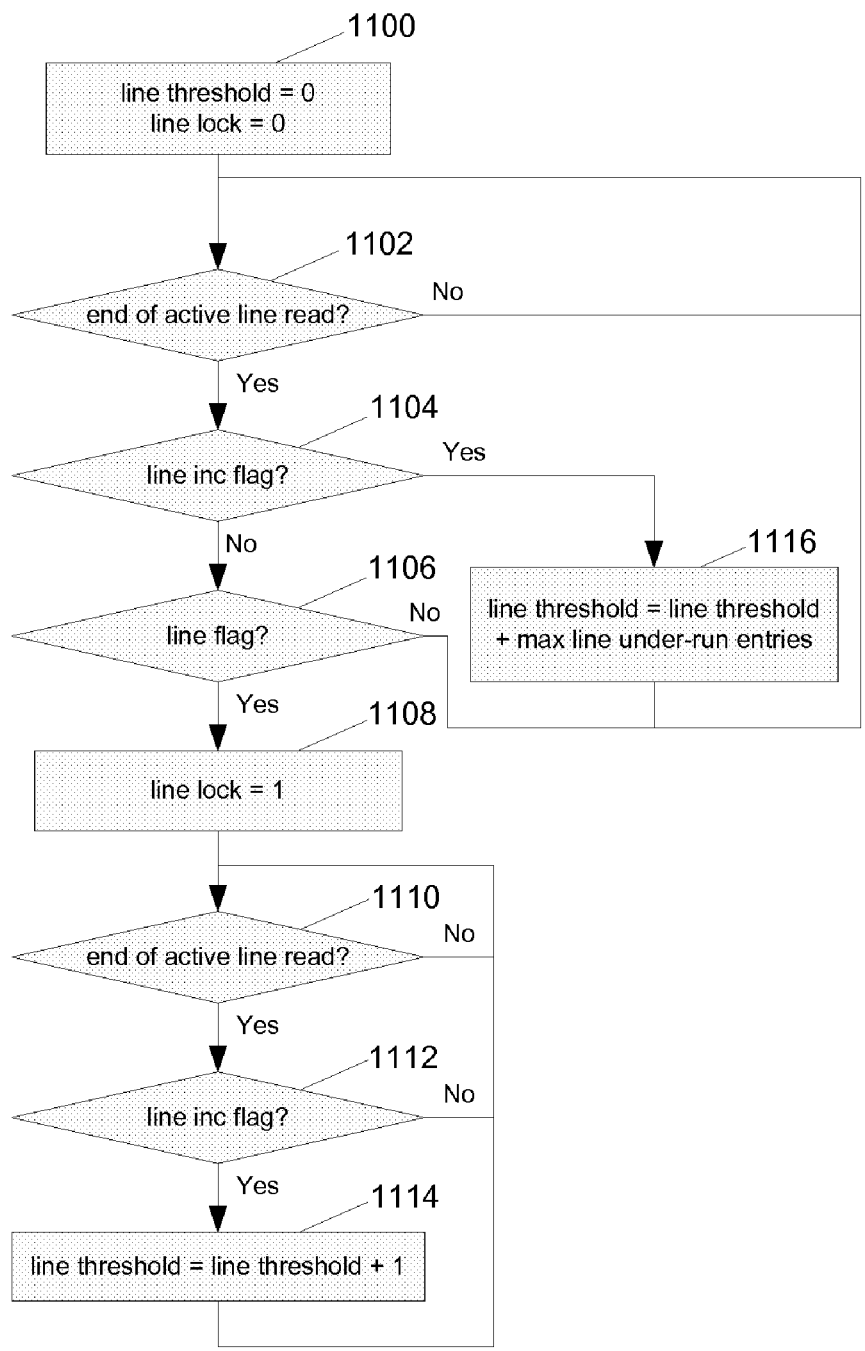
FIG. 11 illustrates a state diagram of adaptive line-threshold control.

FIG. 11 illustrates a state diagram of adaptive line threshold adjustment in block 914 of FIG. 9. At block 1100, the line threshold is set to zero and the line lock is set to 0. At decision block 1102, it is determine whether the end of the active line read has been reached. If no at decision block 1102, then the process waits at decision block 1102 until a yes result. If yes at decision block 1102, at decision block 1104 it is determined whether the line increment flag is equal to 1. If yes at decision block 1104, then at block 1116 the line threshold is updated to equal the current line threshold plus the max line under-run entries.

Maximum line under-run entries are used to set the line threshold. Under-run entries is the number of pixels of under-run when a read control block is reading a display line. If a new line, other than the first line, read begins when FIFO entries is equal to the line threshold, a line flag is set and the under-run status in the current line is monitored. If there is any under-run in this line, the under-run entries are monitored when an under-run flag is set and the under-run entries are compared to get the maximum under-run entries (the worst under-run). The maximum under-run entries will be added to current line threshold to get a new line threshold for the next line read.

Following block 1116, the process returns to decision block 1102. If no at decision block 1104, at decision block 1106 it is determined whether the line flag is equal to 1. If no at decision block 1106, the process returns to decision block 1 102. If yes at decision block 1106, at block 1108 the line lock is set to 1. At decision block 1110, it is determined whether the end of the active line read has been reached. If no at decision block 1110, then the process waits at decision block 1110 until a yes result. If yes at decision block 1110, at decision block 1112 it is determined whether the line increment flag is equal to 1. If no at decision block 1112, the process returns to decision block 11 10. If yes at decision block 1112, at block 1114 the line threshold is updated to equal the current line threshold plus 1.

Figure 12:
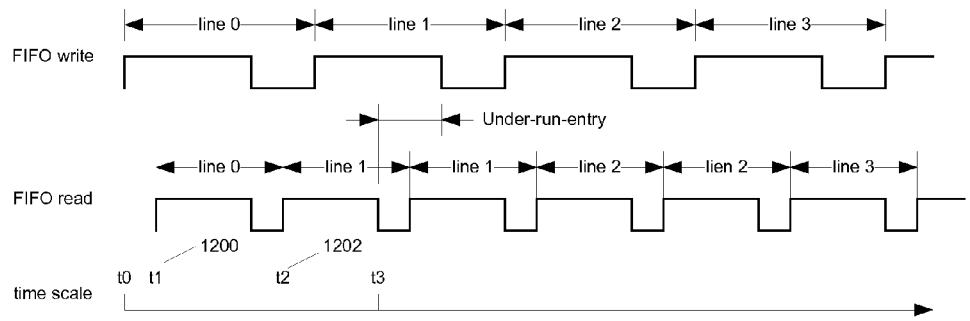
FIG. 12 illustrates under-run before frame threshold adjustment.

After the line threshold LN_TH is set, under-run may still result because at some read addresses, the maximum read period FIFO_RP is reached while the line threshold LN_TH is not reached. Read control 604 must issue the read enable signal 658 for next line in this situation, resulting in under-run the next line. A frame threshold adjustment will solve this under-run problem. FIG. 12 illustrates this under-run before frame threshold adjustment. At a time t1 1200, the line threshold is reached and the read from line 0 data from the link FIFO begins. At the end of the line 0 data read, under-run will not occur if the line threshold is set correctly. If at a time t2 1202, the read period reaches its maximum limit, read controller has to issue read signal for display next line though line threshold has not been reached yet. There will be under-run when reading data from the link FIFO because video line 1 data has not been written to the link FIFO yet.

Figure 13:
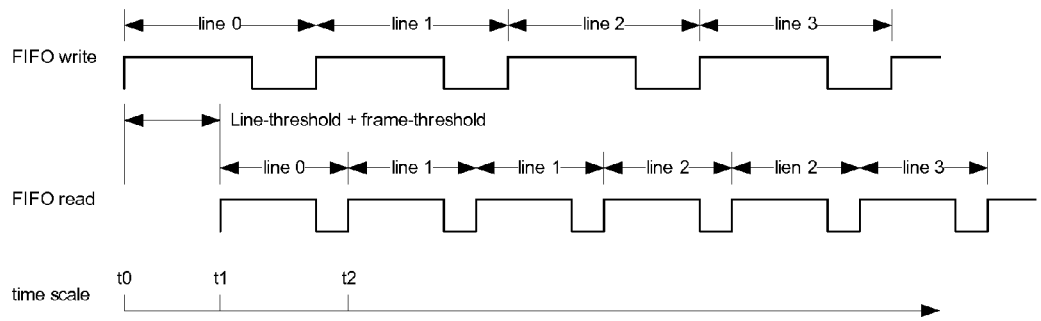
FIG. 13 illustrates after frame-threshold adjustment.

To prevent this under-run, frame threshold control 628 tracks the under-run entries and adjusts the frame threshold for the next frame. At time t2, the frame increment flag 607 is set, during reading of line 1 data, the under-run entries are monitored. The worst under-run case is identified when frame increment flag 607 is set and the maximum under-run entries are applied to frame threshold for the next frame. FIG. 13 illustrates the waveform after a new frame threshold is set.

Maximum frame under-run entries are used to set the frame threshold. If a new line, other than the first line, read begins when the read period is equal to the maximum display line period defined in the display specification and the line threshold has not been reached, a frame flag is set. The maximum under-run entries are searched when the frame flag is set in the current frame. At the end of the active display period in the current frame, the maximum frame under-run entries are obtained. This maximum under-run entries is added to current frame under-run threshold for the next display frame.

Figure 14:
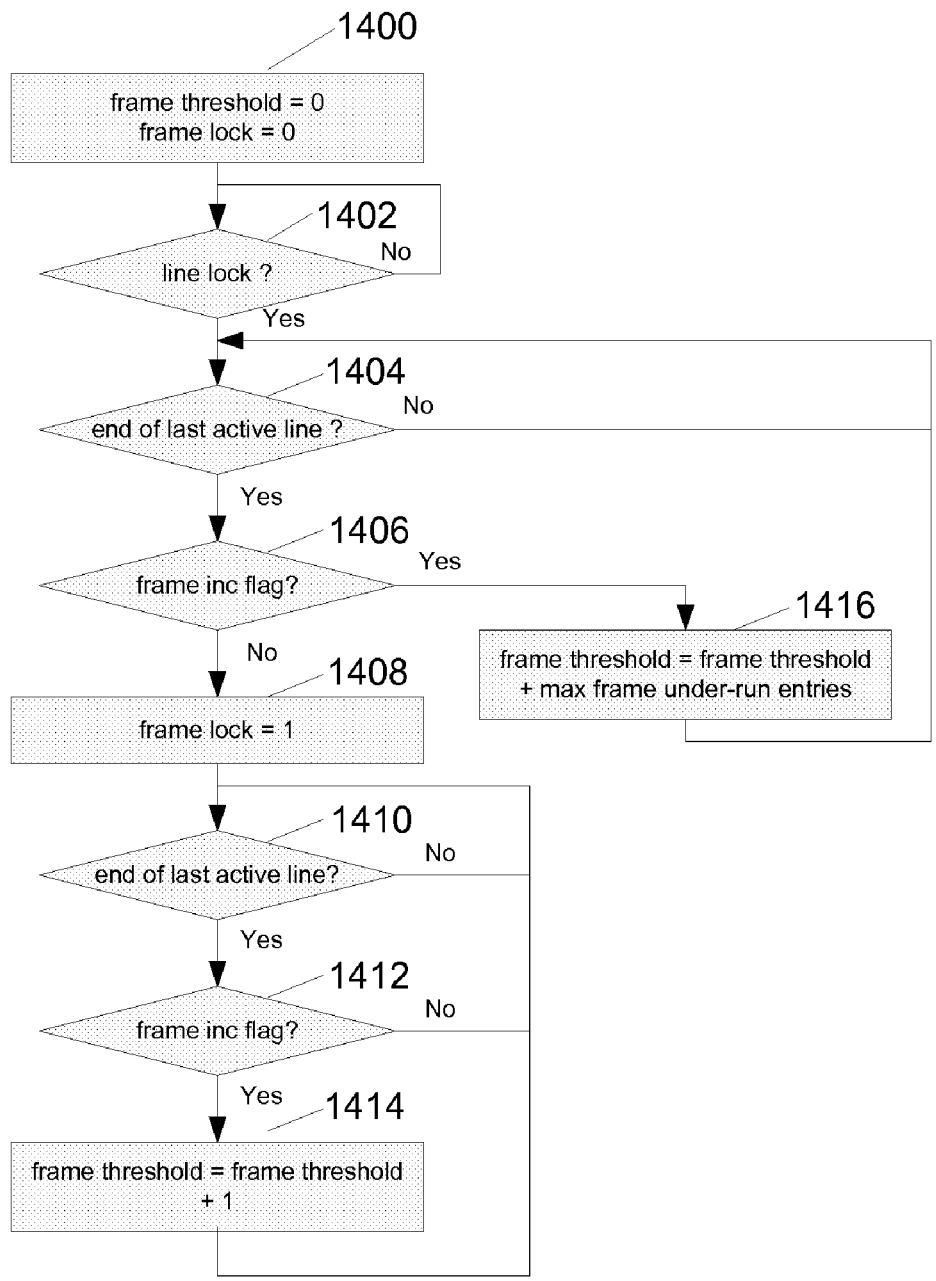
FIG. 14 illustrates a state diagram of adaptive frame-threshold control.

FIG. 14 illustrates a state diagram of adaptive frame threshold adjustment in step 920 of FIG. 9. At block 1400, the frame threshold is set to zero and the frame lock is set to 0. At decision block 1402, it is determine whether the line lock is equal to 1. If no at decision block 1402, then the process waits at decision block 1402 until a yes result. If yes at decision block 1402, at decision block 1404 it is determined whether the end of the last active line has been reached. If no at decision block 1404, then the process waits at decision block 1404 until a yes result. If yes at decision block 1404, at decision block 1406 it is determined whether the frame increment flag is equal to 1. If yes at decision block 1406, at block 1416 the frame threshold is updated to equal the current frame threshold plus the max frame under-run entries. Following block 1416, the process returns to decision block 1404.

If no at decision block 1406, at block 1408 the frame lock is set to 1. At decision block 1410 it is determined whether the end of the last active line has been reached. If no at decision block 1410, then the process waits at decision block 1410 until a yes result. If yes at decision block 1410, at decision block 1412 it is determined whether the frame increment flag is equal to 1. If no at decision block 1412, the process returns to decision block 1410. If yes at decision block 1412, at block 1414 the frame threshold is updated to equal the current frame threshold plus 1.

The read period FIFO_RP is adaptively controlled by read period control 630 to reduce the required link FIFO size. Because the display line period has a range, it can be utilized to reduce the link FIFO size. In general, if the read period is reduced, the FIFO read throughput is increased and the number of entries remaining in the link is reduced. However, reduction of the read period may result in FIFO under-run if reading occurs too fast. Fortunately, since the display line period has a range, read control 604 can wait for the FIFO threshold till the maximum display line period (DSP_LP max) is reached. By this scheme the link FIFO size can be reduced.

In certain cases where the link FIFO is sufficiently large, the minimum FIFO levels are not required. In this case, an over-run flag is used to judge whether there is a need to continue to search the minimum FIFO level. The read period decrement flag is set when the over-run flag is set. The read period may be reduced when the read period decrement flag is set.

Figure 15:
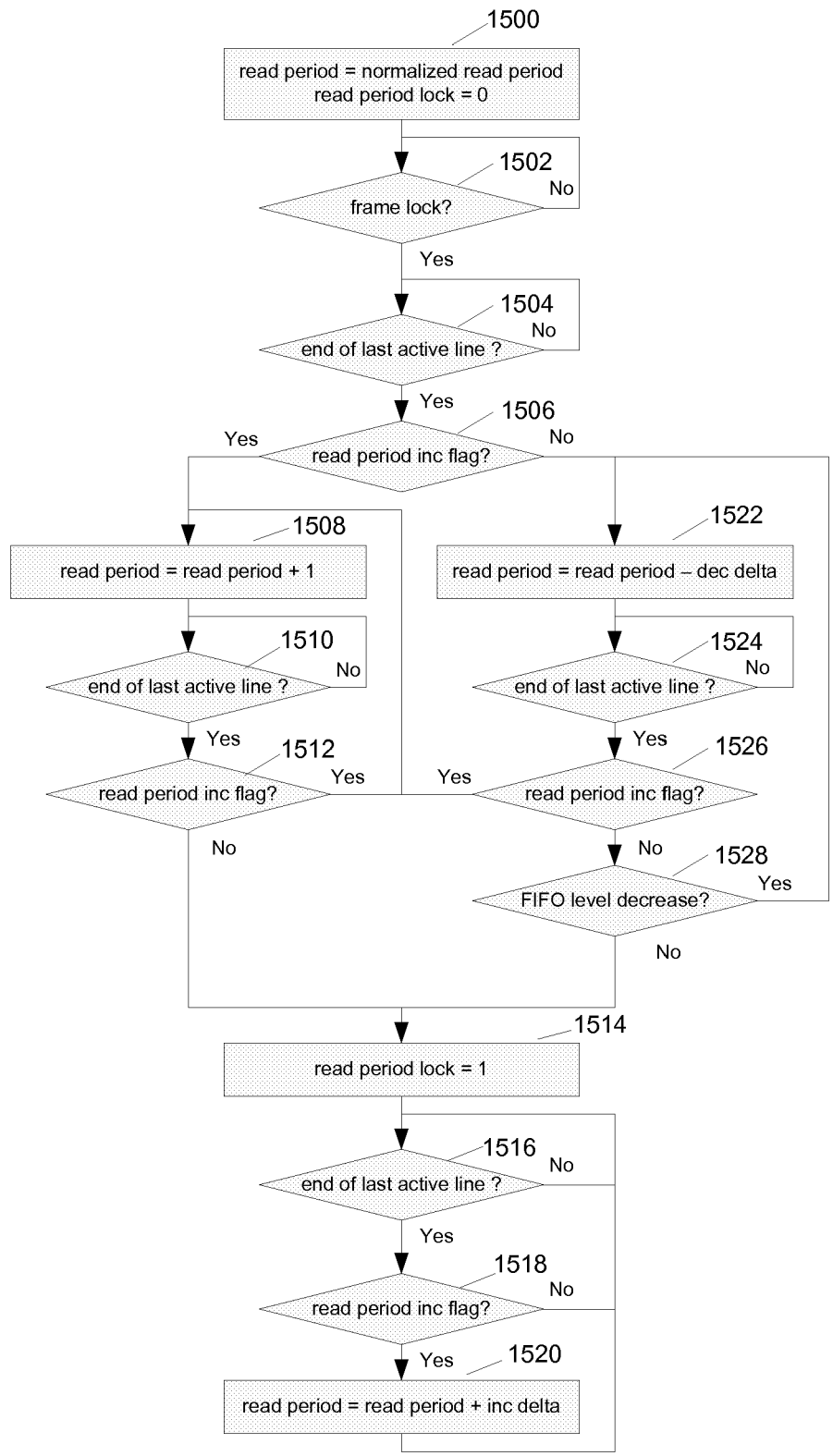
FIG. 15 illustrates a state diagram of adaptive read-period control.

FIG. 15 illustrates a state diagram of adaptive read period control in step 946 of FIG. 9. At block 1500 the read period is set equal to the normalized read period and the read period lock is set to 0. At decision block 1502, it is determined if the frame lock is equal to 1. If no at decision block 1502, then the process waits at decision block 1502 until a yes. If yes at decision block 1502, at decision block 1504 it is determined if the end of the last active line has been reached. If no at decision block 1504, then the process waits at decision block 1504 until a yes. If yes at decision block 1504, then at decision block 1506 it is determined if the read period increment flag is equal to 1. If yes at decision block 1506, then at block 1508, an updated read period is set to the current read period plus 1 cycle. At decision block 1510 it is determined if the end of the last active line has been reached. If no at decision block 1510, the process waits at decision block 1510 until a yes. If yes at decision block 1510, at decision block 1512 it is determined if the read period increment flag is equal to 1. Read period increment flag is set when under-run flag is set in current frame. If yes at decision block 1512, the process returns to block 1508. If no at decision block 1512, the process proceeds to block 1514.

If no at decision block 1506, at block 1522 an updated read period is set to the read period minus decrement delta. At decision block 1524, it is determined whether the end of the last active line has been reached. If no at decision block 1524, the process waits at decision block 1524 until a yes. If yes at decision block 1524, at decision block 1526 it is determined whether the read period increment flag is equal to 1. If yes at decision block 1526, then the process returns to block 1508. If no at decision block 1526, at decision block 1528 it is determined if there is a FIFO level decrease. A FIFO level decrease occurs when the size of the FIFOs needed is decreased, which means the maximum entries the FIFOs hold in the current frame is less than those in the last frame. If yes at decision block 1528, the process returns to block 1522. If no at decision block 1528, the process proceeds to block 1514.

At block 1514, the read period lock is set to 1. At decision block 1516, it is determined if the end of the last active line has been reached. If no at decision block 1516, the process waits at decision block 1516 until a yes. If yes at decision block 1516, at decision block 1518 it is determined if the read period increment flag is equal to 1. If no at decision block 1518, the process returns to decision block 1516. If yes at decision block 1518, at block 1520 an updated read period is set to the read period plus increment delta. Following block 1520, the process returns to decision block 1516.

In one example, adaptive line-period control is used to prevent residue lines at the end of display frame. As described previously, the normalized line period DSP_LP_norm can be pre-calculated. Ideally, if each line period DSP_LP is the same as the normalized line period DSP_LP_norm with the fractional part, there will be exactly the same line numbers as normalized line numbers at the end of each frame. However, in a real process each line period must have an integer number. The line period control 632 accumulates the fractional part of the normalized line period in an accumulator. When there is a carry in the accumulator, the line period for the next line is increased.

During the active display period, the line period DSP_LP is the same as the read period FIFO_RP when the line threshold is reached at the end of the read period. However, in certain instances the line period may stretch to wait for the line threshold. In this situation, the average line period during the active display period is longer than the read period. At the same time, the read period itself is not equal to the normalized line period. A tracking circuit in line period control 632 monitors the difference between real line period and normalized line period. Then, during the non-active display period, the line period is adjusted to compensate for the difference accumulated in active display period and keep the overall line period equal to the normalized line period.

Figure 16:
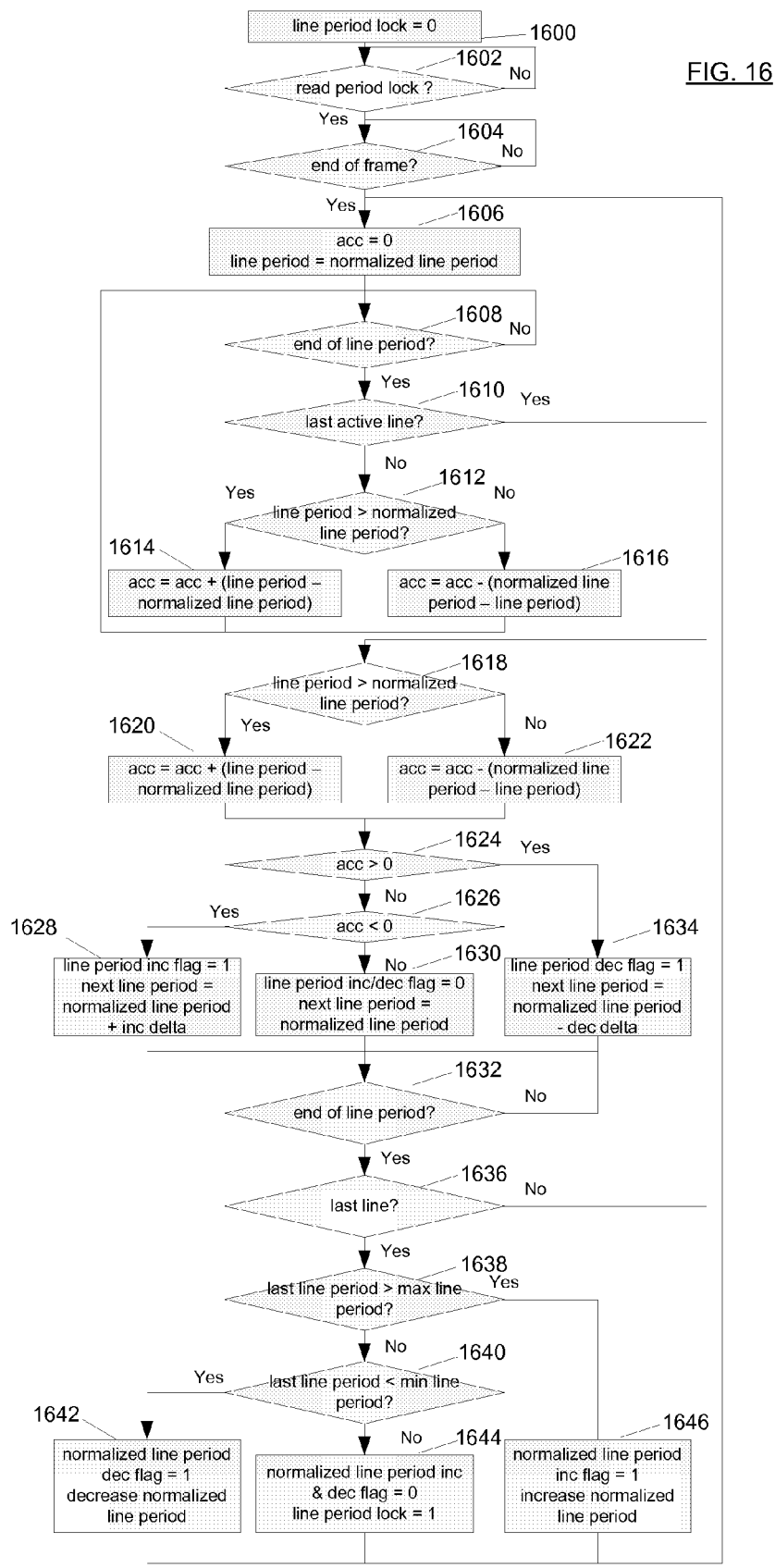
FIG. 16 illustrates a state diagram of adaptive line-period control.

FIG. 16 illustrates a state diagram of adaptive line period control in block 926 and block 956 of FIG. 9. At block 1600, the line period lock is set to 0. At decision block 1602, it is determined whether there is a read period lock. If no at decision block 1602, the process waits at decision block 1602 until yes. If yes at decision block 1602, then at decision block 1604 it is determined whether the end of the frame has been reached. If no at decision block 1604, then the process waits at decision block 1604 until yes. If yes at decision block 1604, then at block 1606, an accumulator is set to 0 and the line period is set to equal the normalized line period DSP_LP_norm. At decision block 1608 it is determine whether the end of the line period has been reached. If no at decision block 1608, the process waits at decision block 1608 until yes. If yes at decision block 1608, then at decision block 1610, it is determined whether the last active line has been reached. If yes at decision block 1610, the process skips to decision block 1618.

If no at decision block 1610, then at decision block 1612 it is determined whether the line period is greater than the normalized line period. If yes at decision block 1612 then at block 1614 an updated accumulator is set to the sum of the current accumulator and the line period minus the normalized line period. Following block 1614, the process returns to decision block 1608. If no at decision block 1612, then at block 1616 an updated accumulator is set to the sum of the current accumulator and the normalized line period minus the line period. Following block 1616, the process returns to decision block 1608.

If yes at decision block 1610, at decision block 1618 it is determined whether the line period is greater than the normalized line period. If yes at decision block 1618, at block 1620 an updated accumulator is set to the sum of the current accumulator and the line period minus the normalized line period. Following block 1620, the process proceeds to decision block 1624. If no at decision block 1618, then at block 1622 an updated accumulator is set to the sum of the current accumulator and the normalized line period minus the line period. Following block 1622, the process proceeds to decision block 1624. At decision block 1624 it is determined whether accumulator is greater than 0. If yes at decision block 1624, then at block 1634 the line period decrement flag is set to 1 and the next line period is set equal to the normalized liner period minus decrement delta. Following block 1634, the process proceeds to decision block 1632. If no at decision block 1624, then at decision block 1626 it is determined whether accumulator is less than 0. If yes at decision block 1626, at block 1628 the line period increment flag is set to 1 and the next line period is set to the normalized line period plus increment delta. Following block 1628 the process proceeds to decision block 1632. If no at decision block 1626, then at block 1630 the line period increment flag and line period decrement flag are set to 0 and the next line period is set to the normalized line period. Following block 1630, the process proceeds to decision block 1632.

At decision block 1632, it is determined if the end of the line period has been reached. If no at decision block 1632, the process waits at decision block 1632 until yes. If yes at decision block 1632, then at decision block 1636 it is determined if the last line of the frame has been reached. If no at decision block 1636, then the process returns to decision block 1618. If yes at decision block 1636, at decision block 1638 it is determined whether the last line period is greater than the maximum line period. If yes at decision block 1638, at block 1646 the normalized line period increment flag is set to 1 and the normalized line period is increased. Following block 1646, the process returns to block 1606.

If no at decision block 1638, then at decision block 1640 it is determined whether the last line period is less than the minimum line period. If yes at decision block 1640, then at block 1642 the normalized line period decrement flag is set to 1 and the normalized line period is decreased. Following block 1642, the process returns to block 1606. If no at decision block 1640, then at block 1644 the normalized line period increment flag and the normalized line period decrement flag is set to 0 and the line period lock is set to 1. Following block 1644, the process returns to block 1606.

In one example, video receiver 600 uses adaptive sync threshold control for frame synchronization. The operation of FIFO read control 604 to generate a FIFO read enable signal 658 has been described earlier. FIFO read control 604 tracks the number of display lines with a line counter. When the line counter equals the normalized line number, read control 604 will wait for first line threshold to begin the first line display of the next frame. When line period lock is set, read control 604 will also wait for the minimum line period.

The Display frame will synchronize with the source video frame by this scheme. By precise clock ratio measurement, fraction line clock generation and tracking, the display frame time can be matched closely with the source video frame time. Ideally, the line period in the last display line will within the display interface timing limits.

However, there is clock frequency variation and link data transmission variation from frame to frame, another scheme is used to ensure the last line period is within the display interface timing limits. One scheme is to measure the under-run entries in the first line when a sync flag is set. The sync flag is set when a first line read signal is issued while the first line threshold is not reached and the last display line period reaches the maximum display line period. Then for the next frame, the sync threshold will increase by the amount of maximum first line under-run entries. The sync threshold is a part of first line threshold, which is used to cover the clock variation and link data transmission variation.

Figure 17:
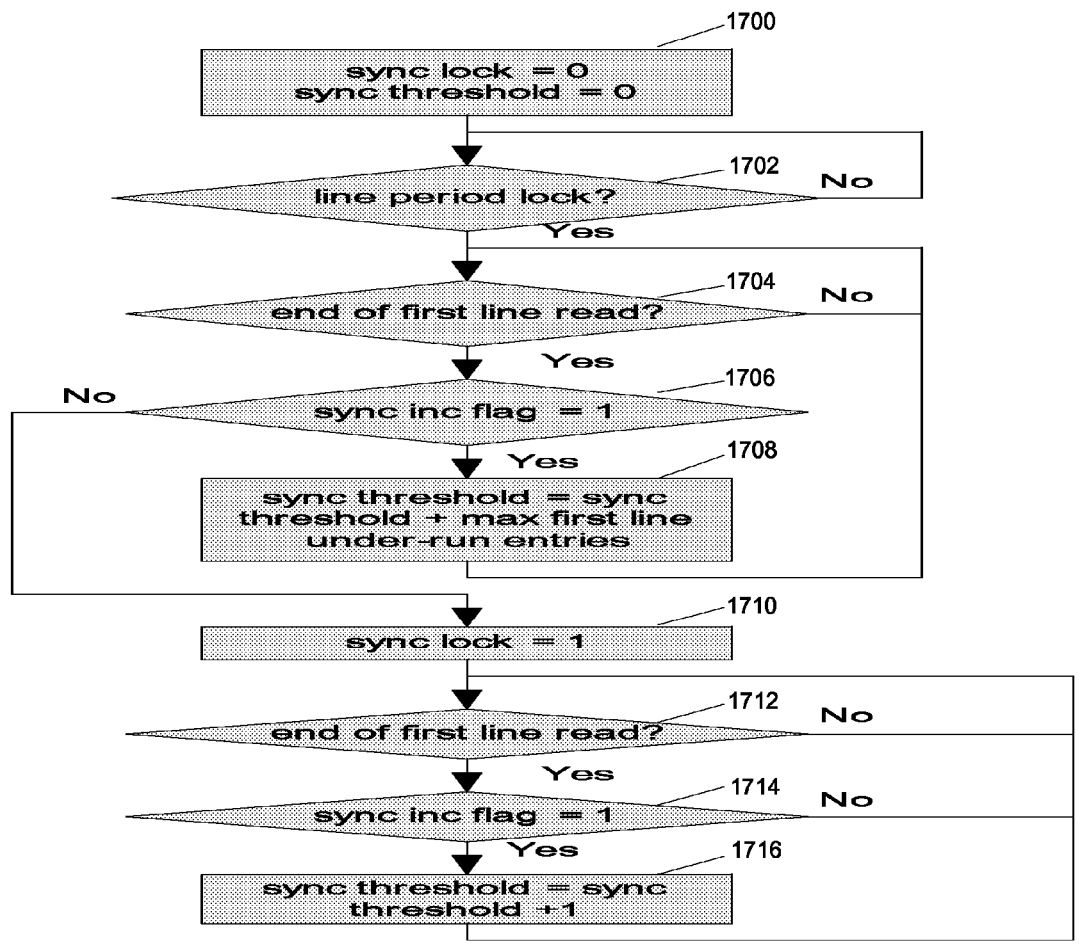
FIG. 17 illustrates a state diagram of adaptive sync-threshold control

FIG. 17 illustrates a state diagram of adaptive sync-threshold control for frame synchronization in block 970 of FIG. 9. At block 1700, the sync lock is set to 0 and the sync threshold is set to 0. At decision block 1702 it is determined whether the line period lock is equal to 1. If no at decision block 1702, the process waits at decision block 1702 until yes. If yes at decision block 1702, at decision block 1704 it is determined if the end of the first line read has been reached. If no at decision block 1704, the process waits at decision block 1704 until yes. If yes at decision block 1704, at decision block 1706 it is determined if the sync increment flag is set to 1. If no at decision block 1706, the process skips to block 1710. If yes at decision block 1706, then at block 1708 the sync threshold is updated to equal the current sync threshold plus the max first line under-run entries. Following block 1708, the process returns to decision block 1704.

If no at decision block 1706, at block 1710 the sync lock is set to 1. At decision block 1712, it is determined if the end of the first line read has been reached. If no at decision block 1712, the process waits at decision block 1712 until yes. If yes at decision block 1712, then at decision block 1714 it is determined if the sync increment flag is set to 1. If no at decision block 1714, then the process returns to decision block 1712. If yes at decision block 1714, then at block 1716 the sync threshold is updated to equal the sync threshold plus 1. Following block 1716, the process returns to decision block 1712.

The systems and methods described herein provide source video to display format conversion in non-pixel-based video interface systems. The circuits and methods provide a simplified design, reduce silicon costs, reduce hardware requirements, and reduce power consumption. The display timing generated by the circuits and methods meets the timing requirements of the display devices. The invention offers a flexible and general solution to all kinds of video display interface systems. Furthermore, the circuits and methods can be extended to future video display interfaces.

Although example circuit configurations have been described in certain example of the invention, one of ordinary skill in the art will recognize that except as otherwise described herein other configurations and components may be used to perform similar functions. For example, although supply referenced driver circuits are described, ground referenced driver circuits may be used. While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for generating a display stream for output to a display device comprising:
   receiving a plurality of link data and a link clock at a video receiver in a packet based video link;
   writing the plurality of link data into a link data buffer, the plurality of link data being free from timing control;
   generating a display device clock from the link clock or a reference clock;
   reading the plurality of link data out of the link data buffer for output to a display device such that a display device timing specification is met and throughput of the link data buffer is balanced, comprising:
   calculating a normalized link data buffer read period and a normalized display line period;
   calculating a line threshold, calculating a frame threshold, and calculating a synchronization threshold; and
   generating a link data buffer read signal based on the line threshold, the frame threshold, the synchronization threshold, the normalized link data buffer read period, the normalized display line period, and a number of entries in the link data buffer available for reading.

2. The method of claim 1, wherein the normalized link data buffer read period and the normalized display line period are adaptively adjusted to reduce the link data buffer size and to prevent a residue line at a display frame end.

3. The method of claim 1, further comprising reducing the link data buffer size by generating a link data buffer read signal after waiting for a link data buffer threshold until a maximum display line period is reached.

4. The method of claim 1, further comprising eliminating a residue line at a display frame end by keeping an overall line period equal to a normalized line period.

5. The method of claim 4, wherein keeping an overall line period equal to a normalized line period comprises:
   monitoring a difference between a real line period and a normalized line period during an active display period; and
   adjusting the overall line period during a non-active display period to compensate for the difference.

6. The method of claim 1, further comprising generating a new line signal and a new frame signal for output to a horizontal/vertical interpolator.

7. The method of claim 1, wherein the link data buffer read signal is generated when the normalized link data buffer read period ends, the number of entries in the link data buffer reaches a link data buffer entries threshold, and the line threshold is satisfied.

8. The method of claim 1, wherein the frame threshold is set after the link data buffer read signal is generated when a maximum link data buffer read period ends and the line threshold is not satisfied.

9. The method of claim 1, further comprising measuring a link data buffer line write time and a link data buffer frame write time.

10. The method of claim 1, wherein calculating a normalized link data buffer read period comprises calculating a product of a link data buffer line write period, a source video vertical size divided by a display vertical size, and a ratio of a display device clock frequency to a link clock frequency.

11. The method of claim 10, wherein the normalized link data buffer read period is between a minimum display line period and a maximum line period.

12. A method for generating a display stream for output to a display device, the method comprising:
receiving a plurality of link data and a link clock at a video receiver in a packet based video link;
writing the plurality of link data into a link data buffer;
generating a display device clock from the link clock or a reference clock; and
reading the plurality of link data out of the link data buffer for output to a display device such that a display device timing specification is met and throughput of the link data buffer is balanced, comprising:
calculating a normalized link data buffer read period, and
calculating a normalized display line period comprising dividing a display frame time by a normalized display frame period, wherein the display frame time is equal to a product of a link data buffer frame write time and a ratio of a display device clock frequency to a link clock frequency, and wherein the normalized display frame period is equal to the display frame time divided by a normalized FIFO read period rounded to a nearest integer.

13. The method of claim 12, wherein the normalized display line period is a fractional number.

14. The method of claim 12, further comprising eliminating a residue line at a display frame end by keeping an overall line period equal to the normalized display line period.

15. The method of claim 14, wherein keeping an overall line period equal to the normalized display line period comprises:
monitoring a difference between a real line period and the normalized display line period during an active display period; and
adjusting the overall line period during a non-active display period to compensate for the difference.

16. The method of claim 1, further comprising measuring a ratio of a display device clock frequency to a link clock frequency.

17. The method of claim 1, wherein the link data buffer comprises a plurality of FIFO buffers, and wherein writing the plurality of link data into a link data buffer comprises writing multiple pixels per link clock cycle.

18. The method of claim 1, wherein the link data buffer comprises a plurality of FIFO buffers, and wherein reading the plurality of link data out of the link data buffer for output to a display device comprises reading two or more pixels per display clock cycle.

19. The method of claim 18, wherein reading two or more pixels per display clock cycle comprises reading pixels from two or more video lines per display clock cycle.

20. The method of claim 1, further comprising calculating an initial normalized link data buffer read period, an initial normalized display line period, and an initial normalized display frame period.

21. The method of claim 1, wherein calculating a line threshold comprises monitoring an under-run entries value when reading a display line.

22. The method of claim 1, wherein calculating a frame threshold comprises obtaining a maximum under-run entries when a new line read begins when a maximum link data buffer read period is equal to a maximum display line period and the line threshold has not been reached.

23. The method of claim 1, wherein calculating a synchronization threshold comprises monitoring an under-run entries value in a first line of a frame when a first line read signal is issued while a first line threshold is not reached and a last line period reaches a maximum line period.

24. The method of claim 1, wherein the video receiver is a multiple input format video receiver which has at least one input that is non-pixel based.

* * * * *